United States Patent
Oswal et al.

(10) Patent No.: US 7,496,061 B2
(45) Date of Patent: Feb. 24, 2009

(54) PROVIDING A MULTICAST SERVICE USING A MULTICAST GROUP-SOURCE KEY

(75) Inventors: Anand K. Oswal, Santa Clara, CA (US); Jayaraman R. Iyer, Sunnyvale, CA (US); Liming Wei, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 562 days.

(21) Appl. No.: 11/137,597

(22) Filed: May 25, 2005

(65) Prior Publication Data

US 2006/0271780 A1 Nov. 30, 2006

(51) Int. Cl.
*H04L 12/56* (2006.01)

(52) U.S. Cl. .................. 370/312; 370/390; 370/432; 370/338; 370/401; 370/329; 709/203; 709/231; 709/236

(58) Field of Classification Search .............. 370/312, 370/390, 432, 338, 401, 329, 400; 709/203, 709/231, 236
See application file for complete search history.

(56) References Cited

U.S. PATENT DOCUMENTS

| | | | |
|---|---|---|---|
| 6,584,566 B1 | 6/2003 | Hardjono | 713/163 |
| 7,055,030 B2 | 5/2006 | Negawa | 713/163 |
| 7,075,904 B1 * | 7/2006 | Manish et al. | 370/312 |
| 7,191,332 B1 * | 3/2007 | Pankajakshan et al. | 713/163 |
| 2004/0185837 A1 * | 9/2004 | Kim et al. | 455/414.3 |
| 2005/0041608 A1 * | 2/2005 | Jeong et al. | 370/310 |
| 2005/0076369 A1 * | 4/2005 | Cai et al. | 725/62 |
| 2006/0009247 A1 * | 1/2006 | Kelley et al. | 455/515 |
| 2006/0109812 A1 * | 5/2006 | Kim et al. | 370/329 |

OTHER PUBLICATIONS

"Peering Into the WiMAX Spec: Part 2, The emergence of the 802.16 protocol has brought new life into the delivery of data services over fixed broadband wireless links." Wireless Net DesignLine; CMP United Business Media, http://www.wirelessnetdesignline.com/showArticle, 11 pages, Jan. 21, 2004.
"Telephony's Complete Guide To WiMax", Telephony, Wimax © Telephony 2004, pp. 1-19, May 31, 2004.
WiMAX Forum—Technology, © 2005 WiMax Forum, http://www.wimaxforum.org/technology, 3 pages, Printed May 23, 2005.
PCT Notification of Transmittal of the International Search Report and the Written Opinion of the International Searching Authority, or the Declaration with attached PCT International Search Report and Written Opinion of the International Authority in International Application No. PCT/US 06/16918, dated Aug. 13, 2007, 7 pages.

* cited by examiner

*Primary Examiner*—Alexander Eisen
*Assistant Examiner*—Julio R Perez
(74) *Attorney, Agent, or Firm*—Baker Botts L.L.P.

(57) ABSTRACT

Providing a multicast service to a mobile node includes receiving a first request to join a multicast group from a first cell site. The first request requests that a first mobile node be permitted to join the multicast group. A first multicast source operable to provide content to the first mobile node is identified. The multicast group and the first multicast source are associated to yield a first group-source combination. A first key is assigned to the first group-source combination, and the first key is provided to the first cell site.

12 Claims, 3 Drawing Sheets

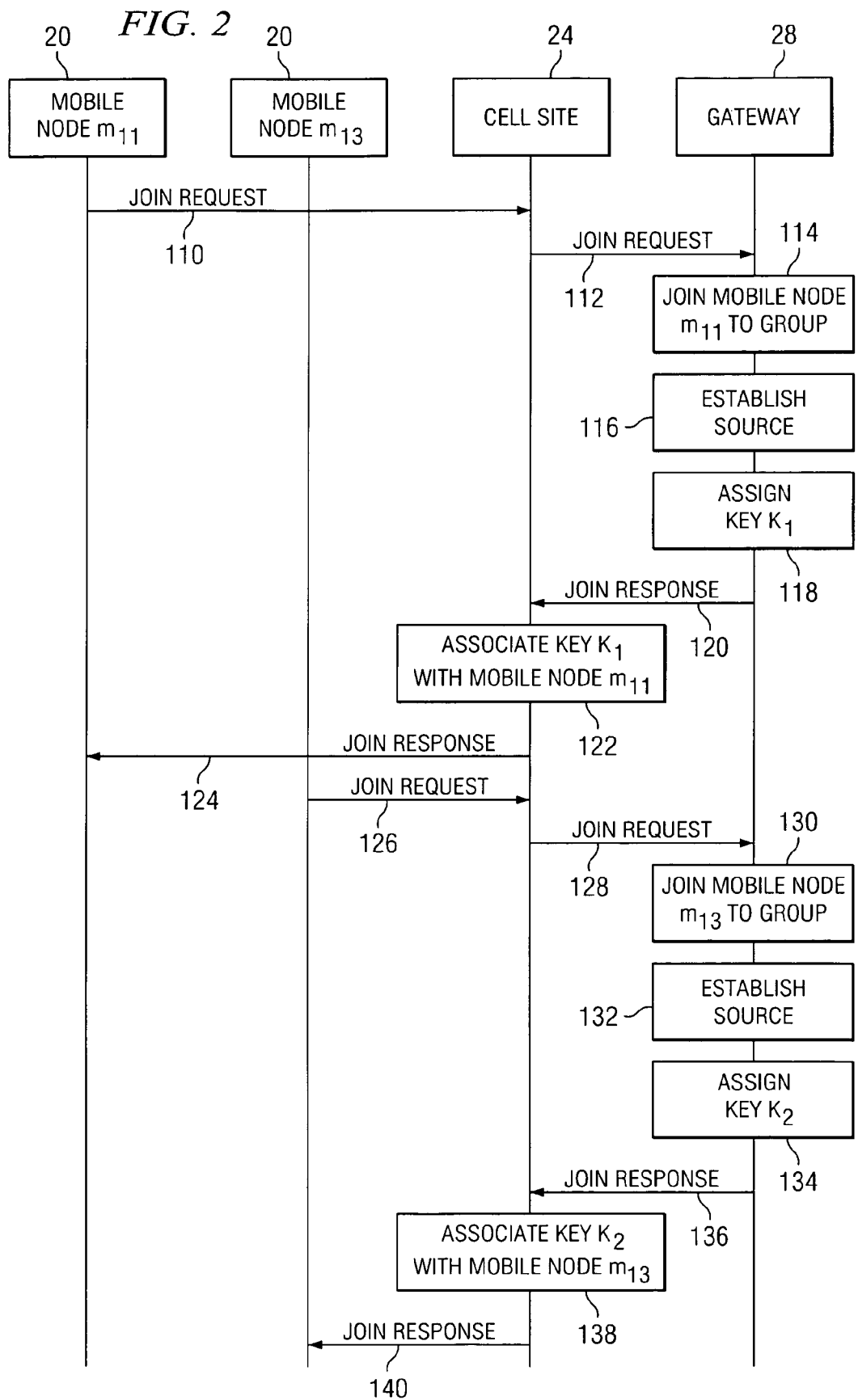

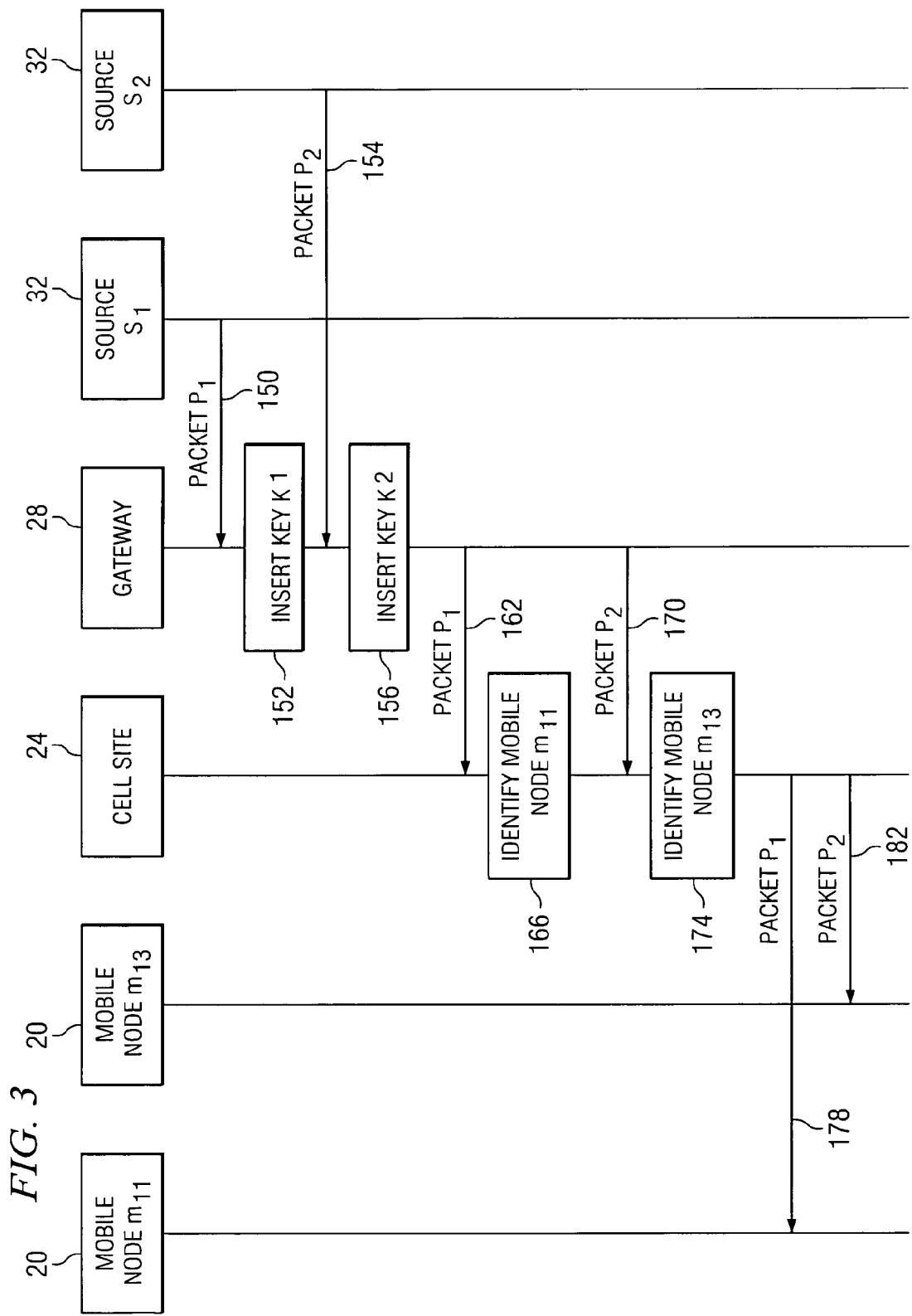

US 7,496,061 B2

PROVIDING A MULTICAST SERVICE USING A MULTICAST GROUP-SOURCE KEY

TECHNICAL FIELD

This invention relates generally to the field of communications and more specifically to providing a multicast service using a multicast group-source key.

BACKGROUND

Multicasting allows content to be distributed to multiple devices of a communication network. To multicast packets to a multicast group, a single device may send copies of the packets to the members of the multicast group. Multicasting typically involves distributing packets using a group identifier that uniquely identifies the multicast group. In certain situations, however, the group identifier itself might not provide for effective multicast group identification. For example, a group identifier might not be sufficient in networks that have private or overlapping addresses. It is generally desirable to effectively distribute packets.

SUMMARY OF THE DISCLOSURE

In accordance with the present invention, disadvantages and problems associated with previous techniques for providing a multicast service may be reduced or eliminated.

According to one embodiment of the present invention, providing a multicast service to a mobile node includes receiving a first request to join a multicast group from a first cell site. The first request requests that a first mobile node be permitted to join the multicast group. A first multicast source operable to provide content to the first mobile node is identified. The multicast group and the first multicast source are associated to yield a first group-source combination. A first key is assigned to the first group-source combination, and the first key is provided to the first cell site.

Certain embodiments of the invention may provide one or more technical advantages. A technical advantage of one embodiment may be that a key is assigned to a combination of a multicast group and a multicast source, such as a multicast service provider. Assigning the key to the combination provides for distinguishing among multicast sources that provide content to the same multicast group. Distinguishing among the multicast sources may provide for more effective distribution of packets for private multicast services.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 2 is a call flow diagram illustrating one embodiment of a method for setting up multicast services that may be used with the system of FIG. 1; and FIG. 3 is a flowchart illustrating one embodiment of a method for multicasting content that may be used with the system of FIG. 1.

DETAILED DESCRIPTION OF THE DRAWINGS

Figure 1:
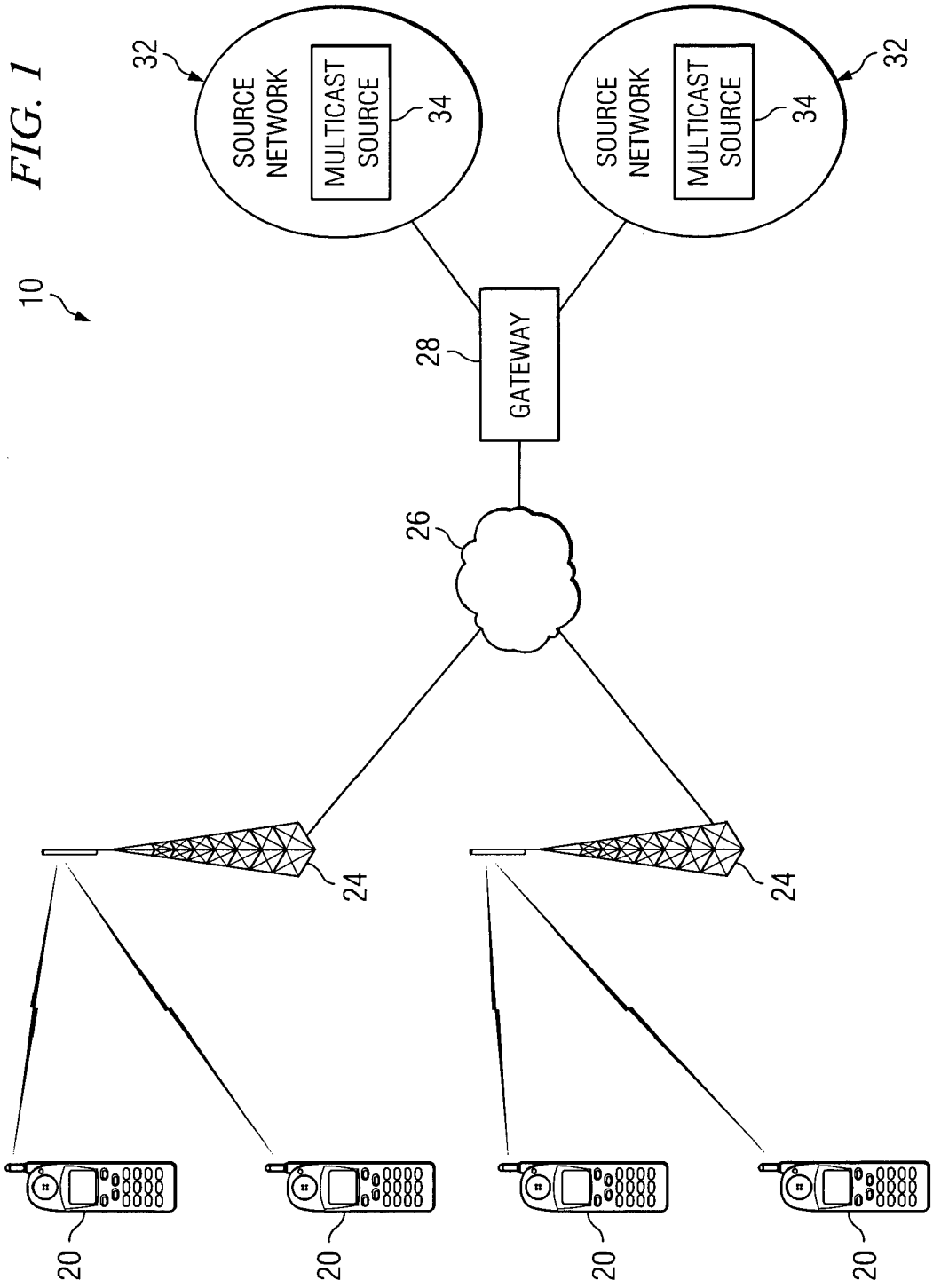
FIG. 1 is a block diagram illustrating one embodiment of a system that provides multicast services.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a network system 10 that provides multicast services. System 10 assigns a key to a combination of a multicast group and a multicast source. Assigning the key to the combination provides for distinguishing among multicast sources that provide content to the same multicast group. Distinguishing among the multicast sources may provide for more effective distribution of packets for private multicast services.

According to the illustrated embodiment, system 10 operates to provide services such as communication sessions to endpoints such as mobile node 20. A communication session may refer to an active communication between endpoints, measured from endpoint to endpoint. Information is communicated during a communication session. Information may refer to voice, data, text, audio, video, multimedia, control, signaling, other information, or any combination of the preceding. System 10 may communicate information in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards such as 802.11 and 802.16 standards, International Telecommunications Union (ITU-T) standards, European Telecommunications Standards Institute (ETSI) standards, Internet Engineering Task Force (IETF) standards, or other standards. According to one embodiment, system 10 may operate according to the WiMAX protocols, also known as the IEEE 802.16 standards. The WiMAX protocols specify fixed and mobile point-to-multipoint and multipoint-to-multipoint communication for broadband wireless systems.

According to the embodiment, system 10 is operable to multicast packets to a multicast group comprising devices of system 10. Multicasting may refer to the communication of packets from a single device to multiple member devices of a multicast group. The single device may send copies of packets to the member devices of the multicast group. A multicast group may refer to a set of devices to which packets are multicast. A multicast group may be represented by, for example, identifiers, such as addresses, of the members of the multicast group. A multicast group may have a group identifier that uniquely identifies the multicast group. IP multicast procedures use Class D Internet addresses.

According to the illustrated embodiment, system 10 includes one or more mobile nodes 20, one or more cell sites 24, a communication network 26, a gateway 28, and one or more source networks 32 coupled as shown. Mobile node 20 represents any suitable device operable to communicate with a communication system. In general, a device may include any suitable arrangement of components and logic operable to perform the operations of the device. "Logic" may refer to hardware, software, other logic, or any suitable combination of the preceding. Mobile node 20 may comprise, for example, a personal digital assistant, a computer such as a laptop, a cellular telephone, a mobile handset, or any other device operable to communicate with system 10.

Cell site 24 represents any suitable device that provides wireless services to mobile node 20 present in, or visiting, a cell. For example, cell site 24 may represent an access point, a base station, a router, or any combination of the preceding. An access point may refer to a network point that couples a wireless network, such as a wireless radio network, to a wired network, such as a wired area network. A cell may refer to a geographic unit of a network attachment point of a communication network. As an example, a cell may refer to a cell of a cellular network or a hot spot of a wireless network. A mobile node 20 may be present in, or visiting, a cell if mobile node 20 is within the range of cell site 24 of the cell.

A cell site 24 may comprise any suitable logic operable to provide wireless services to mobile nodes 20 present in a cell. According to one embodiment, cell site 24 includes a base transceiver station and a base station controller. The base transceiver station communicates signals to and from mobile node 20 through a wireless link that is typically a radio frequency link. The base station controller manages the operation of the base transceiver station.

Network 26 represents a communication network that allows devices such as mobile node 20 to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Gateway 28 represents any suitable device operable to multicast packets to members of a multicast group. According to the illustrated embodiment, gateway 28 multicasts packets to cell sites 24. To multicast the packets, gateway 28 maintains a list of the members of the multicast group. The list may include identifiers, such as addresses, of the members.

Gateway 28 also assigns a key to each group-source combination. A key may refer to any suitable identifier that uniquely identifies a group-source combination. As an example, a key may comprise a tag or other value. A group-source combination may refer to the combination of a multicast group and a multicast source operable to provide content to the multicast group. Accordingly, a combination of a group and a first source would be assigned a different key than a combination of the group and a second source. Moreover, the same key is provided for members of the same group serviced by the same source, regardless of whether the same or different cell sites 24 that are servicing the members. A key may make the multicast interaction between gateway 28 and cell site 24 independent of the multicast addressing.

TABLE 1 illustrates example groups and keys for group-source combinations.

TABLE 1

| Group | Members | Source | Key |
|---|---|---|---|
| $G_1$ | $m_{11}, m_{12}$ | $S_1$ | $K_1$ |
| $G_1$ | $m_{13}, m_{14}$ | $S_2$ | $K_2$ |
| $G_2$ | $m_{21}, m_{22}$ | $S_1$ | $K_3$ |

TABLE 1 lists group $G_1$ with members $m_{11}$, $m_{12}$, $m_{13}$, and $m_{14}$ and group $G_2$ with members $m_{21}$ and $m_{22}$. Members may be serviced by any suitable combination of cell sites 24. Source $S_1$ provides content to members $m_{11}$, $m_{12}$, $m_{21}$ and $m_{22}$, and source $S_2$ provides content to members $m_{13}$ and $m_{14}$. Key $K_1$ is assigned to the combination $G_1$-$S_1$, key $K_2$ is assigned to the combination $G_1$-$S_2$, and key $K_3$ is assigned to the combination $G_2$-$S_1$. Members associated with the same group-source combination are assigned the same key, regardless of whether they are serviced by the same or different cell sites 24.

Gateway 28 may provide other suitable operations. For example, gateway 28 may convert communications between different communication protocols. For example, gateway 28 may convert communications from a protocol used by network 32 to a different protocol, or vice-versa.

Source network 32 represents a communication network that includes a multicast source 34. Multicast source 34 may refer to a server that provides content to be distributed to a multicast group. As an example, source network 32 may comprise a core server network operated by a service provider. According to one embodiment, different source networks 32 may use private addresses for each multicast group. Accordingly, a source network 32 may refer to a domain that uses different addresses for a multicast group than the addresses used by another source network 32.

System 10 may include other suitable components operable to facilitate communications sessions. As an example, system 10 may include a home agent and a foreign agent. A home agent of a mobile node 20 may refer to an agent that maintains the address of mobile node 20 and forwards packets to mobile node 20. A foreign agent of mobile node 20 may refer to an agent that provides the home agent of mobile node 20 with an address to which packets for mobile node 20 may be forwarded.

As another example, system 10 may include an authorization server. An authorization server may represent any suitable device operable to provide authorization-related services. Authorization-related services may include services for authentication, authorization, accounting, or any suitable combination of the preceding. Authentication may refer to validating the identity of mobile node 20. Authorization may refer to authorizing a level of service for mobile node 20. Accounting may refer to tracking the usage of resources. As an example, an authorization server may provide one, two, or three of the listed services.

A component of system 10 may include logic, an interface, memory, other component, or any suitable combination of the preceding. Certain logic may manage the operation of a device, and may comprise, for example, a processor. "Processor" may refer to any suitable device operable to execute instructions and manipulate data to perform operations. "Interface" may refer to logic of a device operable to receive input for the device, send output from the device, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Modifications, additions, or omissions may be made to system 10 without departing from the scope of the invention.

The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a call flow diagram illustrating one embodiment of a method for setting up multicast services that may be used with system 10 of FIG. 1. For purposes of illustration, the method is described using TABLE 1. Any suitable data structure, however, may be used. The method begins at step 110, where mobile node $m_{11}$ 20 sends a join request to cell site 24. A join request may refer to a message that may be used to request access to content distributed to a multicast group. The join request may include a group identifier $G_1$ for multicast group $G_1$. Cell site 24 forwards the join request to gateway 28 at step 112.

Gateway 28 joins mobile node $m_{11}$ 20 to the requested multicast group $G_1$ at step 114. Gateway 28 may perform any suitable procedure for joining mobile node $m_{11}$ 20 to multicast group $G_1$. As an example, gateway 28 may first establish whether mobile node $m_{11}$ 20 is authorized to join multicast group $G_1$. An authorization server may facilitate the authorization process. If mobile node $m_{11}$ 20 is authorized, gateway 28 may then add an identifier $m_{11}$ for mobile node $m_{11}$ 20 to the multicast group list for multicast group $G_1$.

Gateway 28 establishes a multicast source $S_1$ designated to provide the multicast content to mobile node $m_{11}$ 20 at step 116. Gateway 28 assigns a key $K_1$ to the group $G_1$-source $S_1$ combination of mobile node $m_{11}$ 20 at step 118. Gateway 28 sends a join response to cell site 24 at step 120. A join response may refer to a message that indicates whether a mobile node can join the requested multicast group. The join response may include the assigned key $K_1$. The assigned key, however, may be provided to cell site 24 in any suitable message. Cell site 24 associates key $K_1$ with mobile node $m_{11}$ 20 at step 122. The key may be used to establish a tunnel between gateway 28 and cell site 24. Cell site 24 forwards the join response to mobile node $m_{11}$ 20 at step 124.

Mobile node $m_{13}$ 20 sends a join request to cell site 24 at step 126. The join request may include a group identifier $G_1$ for multicast group $G_1$. Cell site 24 forwards the join request to gateway 28 at step 128. Gateway 28 joins mobile node $m_{13}$ 20 to the requested user group $G_1$ at step 130. Gateway 28 establishes a multicast source $S_2$ designated to provide the multicast content to mobile node $m_{13}$ 20 at step 132. Gateway 28 assigns a key $K_2$ to the group $G_1$-source $S_1$ combination of mobile node $m_{13}$ 20 at step 134. Gateway 28 sends a join response to cell site 24 at step 136. Cell site 24 associates key $K_2$ with mobile node $m_{13}$ 20 at step 138, and forwards the join response to mobile node $m_{13}$ 20 at step 140. After forwarding the response, the message terminates.

Modifications, additions, or omissions may be made to the method without departing from the scope of the invention. The method may include more, fewer, or other steps. Additionally, steps may be performed in any suitable order without departing from the scope of the invention.

FIG. 3 is a flowchart illustrating one embodiment of a method for multicasting content to mobile nodes 20 that may be used with system 10 of FIG. 1. For purposes of illustration, the method is described using TABLE 1. Any suitable data structure, however, may be used.

Multicast source $S_1$ 32 sends a packet $P_1$ for multicast group $G_1$ to gateway 28 at step 150. Packet $P_1$ includes identifiers for multicast group $G_1$ and multicast source $S_1$ 32. As an example, packet $P_1$ may include a destination address that corresponds to identifier $G_1$ of multicast group $G_1$, and may include a source address that corresponds to multicast source $S_1$ 32. Gateway 28 identifies key $K_1$ as associated with multicast group $G_1$ and multicast source $S_1$ 32 and inserts key $K_1$ into packet $P_1$ at step 152.

Multicast source $S_2$ 32 sends a packet $P_2$ for multicast group $G_1$ to gateway 28 at step 154. Packet $P_2$ includes identifiers for multicast group $G_1$ and multicast source $S_2$ 32. Gateway identifiers key $K_2$ as associated with multicast group $G_1$ and multicast source $S_2$ 32, and inserts key $K_2$ into packet $P_2$ at step 156.

Gateway 28 sends packet $P_1$ to cell site 24 at step 162. Cell site 24 identifies mobile node $m_{11}$ 20 as associated with key $K_1$ at step 166. Gateway 28 sends packet $P_2$ to cell site 24 at step 170. Cell site 24 identifies mobile node $m_{13}$ 20 as associated with key $K_2$ at step 174. Cell site 24 forwards packet $P_1$ to mobile node $m_{11}$ 20 at step 178. Cell site 24 forwards packet $P_2$ to mobile node $m_{13}$ 20 at step 182. After forwarding the packet, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that a key is assigned to a combination of a multicast group and a multicast source. Assigning the key to the combination provides for distinguishing among multicast sources that provide content to the same multicast group. Distinguishing among the multicast sources may provide for more effective distribution of packets for private multicast services.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method to provide a multicast service to a mobile node, comprising:
   receiving a first request to join a multicast group, the first request requesting that a first mobile node serviced by a first cell site be permitted to join the multicast group;
   identifying a first multicast source that operates to provide content to the first mobile node;
   associating the multicast group and the first multicast source to yield a first group-source combination;
   assigning, by a gateway, a first key to the first group-source combination;
   providing the first key to the first cell site;
   receiving a second request to join the multicast group, the second request requesting that a second mobile node be permitted to join the multicast group;
   identifying a second multicast source that operates to provide the content to the second mobile node;
   associating the multicast group with the second source to yield a second group-source combination;
   assigning a second key to the second group-source combination;
   receiving a third request to join the multicast group, the third request requesting that a third mobile node serviced by a third cell site be permitted to join the multicast group;

establishing that the first multicast source operates to provide the content to the third mobile node; and
providing the first key to the third cell site.

2. The method of claim 1, further comprising:
receiving a packet for the multicast group from the first multicast source;
identifying the first key associated with the first multicast source;
inserting the first key into the packet; and
sending the packet to the first cell site.

3. The method of claim 1, further comprising:
establishing that the mobile node is authorized to join the multicast group.

4. A network device that provides a multicast service to a mobile node, comprising:
an interface that operates to:
receive a first request to join a multicast group, the first request requesting that a first mobile node serviced by a first cell site be permitted to join the multicast group; and
a processor coupled to the interface and that operates to:
identify a first multicast source that operates to provide content to the first mobile node;
associate the multicast group and the first multicast source to yield a first group-source combination;
assign a first key to the first group-source combination;
provide the first key to the first cell site;
receive a second request to join the multicast group, the second request requesting that a second mobile node be permitted to join the multicast group;
identify a second multicast source that operates to provide the content to the second mobile node;
associate the multicast group with the second source to yield a second group-source combination;
assign a second key to the second group-source combination;
receive a third request to join the multicast group, the third request requesting that a third mobile node serviced by a third cell site be permitted to join the multicast group;
establish that the first multicast source operates to provide the content to the third mobile node; and
provide the first key to the third cell site.

5. The network device of claim 4, the processor further operates to:
receive a packet for the multicast group from the first multicast source;
identify the first key associated with the first multicast source;
insert the first key into the packet; and
send the packet to the first cell site.

6. The network device of claim 4, the processor further operates to:
establish that the mobile node is authorized to join the multicast group.

7. The network device of claim 4, the processor further operates to:
establish that the second mobile node is authorized to join the multicast group;
receive a packet for the multicast group from the first multicast source;
identify the first key associated with the first multicast source;
insert the first key into the packet; and
send the packet to the first cell site.

8. A system that provides a multicast service to a mobile node, comprising:
means for receiving a first request to join a multicast group, the first request requesting that a first mobile node serviced by a first cell site be permitted to join the multicast group;
means for identifying a first multicast source that operates to provide content to the first mobile node;
means for associating the multicast group and the first multicast source to yield a first group-source combination;
means for assigning, by a gateway, a first key to the first group-source combination;
means for providing the first key to the first cell site;
means for receiving a second request to join the multicast group, the second request requesting that a second mobile node be permitted to join the multicast group;
means for identifying a second multicast source that operates to provide the content to the second mobile node;
means for associating the multicast group with the second source to yield a second group-source combination;
means for assigning a second key to the second group-source combination;
means for receiving a third request to join the multicast group, the third request requesting that a third mobile node serviced by a third cell site be permitted to join the multicast group;
means for establishing that the first multicast source operates to provide the content to the third mobile node; and
means for providing the first key to the third cell site.

9. A network system to provide a multicast service to a mobile node, comprising:
a cell site that operates to:
receive a first request to join a multicast group from a first mobile node, the first request requesting that the first mobile node be permitted to join the multicast group; and
a gateway in communication with the cell site and that operates to:
receive the first request from the cell site;
identify a first multicast source that operates to provide content to the first mobile node;
associate the multicast group and the first multicast source to yield a first group-source combination;
assign a first key to the first group-source combination;
provide the first key to the cell site;
receive a second request to join the multicast group, the second request requesting that a second mobile node be permitted to join the multicast group;
identify a second multicast source that operates to provide the content to the second mobile node;
associate the multicast group with the second source to yield a second group-source combination;
assign a second key to the second group-source combination;
receive a third request to join the multicast group, the third request requesting that a third mobile node serviced by a third cell site be permitted to join the multicast group;
establish that the first multicast source operates to provide the content to the third mobile node; and
provide the first key to the third cell site;
the cell site further operates to:
receive the first key from the gateway; and
associate the first key with the first mobile node.

10. The network system of claim 9, the gateway further operates to:
- receive a packet for the multicast group from the first multicast source;
- identify the first key associated with the first multicast source;
- insert the first key into the packet; and
- send the packet to the cell site.

11. The network system of claim 9, the cell site further operates to:
- receive a packet from the gateway, the packet communicating the first key; and
- identify the first mobile node associated with the first key; and
- send the packet to the first mobile node.

12. The network system of claim 9, wherein:
the gateway further operates to:
- receive a packet for the multicast group from the first multicast source;
- identify the first key associated with the first multicast source;
- insert the first key into the packet; and
- send the packet to the cell site;

the cell site further operates to:
- receive the packet from the gateway, the packet communicating the first key; and
- identify the first mobile node associated with the first key; and
- send the packet to the first mobile node.

* * * * *